Jan. 8, 1929.

J. M. STEELE 1,698,006

CUSHIONING CONNECTION FOR VEHICLE CONSTRUCTION

Filed Feb. 17, 1927    3 Sheets-Sheet 1

INVENTOR.
JOSEPH M. STEELE
BY Ely & Barrow
ATTORNEYS.

Jan. 8, 1929.

J. M. STEELE 1,698,006

CUSHIONING CONNECTION FOR VEHICLE CONSTRUCTION

Filed Feb. 17, 1927    3 Sheets-Sheet 2

INVENTOR.

Joseph M. Steele

BY Ely & Barrow

ATTORNEYS.

Jan. 8, 1929.
J. M. STEELE
1,698,006
CUSHIONING CONNECTION FOR VEHICLE CONSTRUCTION
Filed Feb. 17, 1927   3 Sheets-Sheet 3
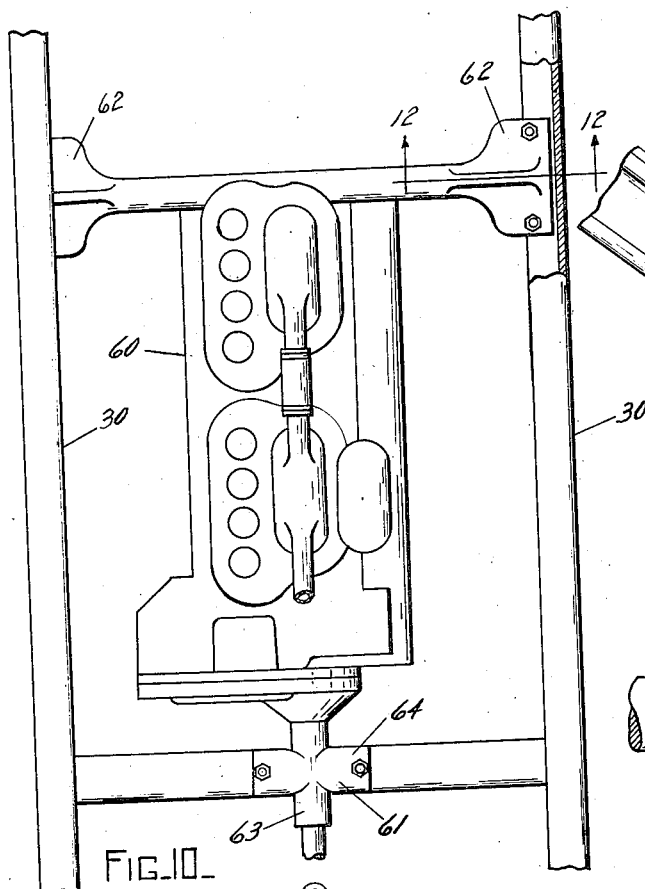
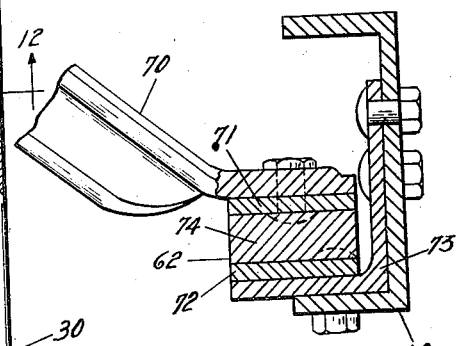
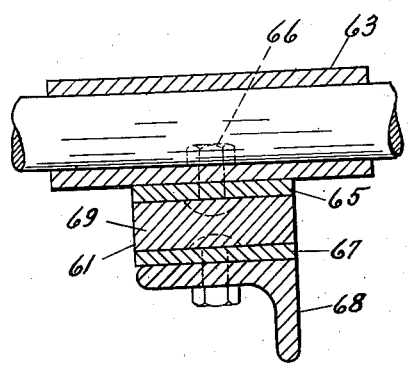
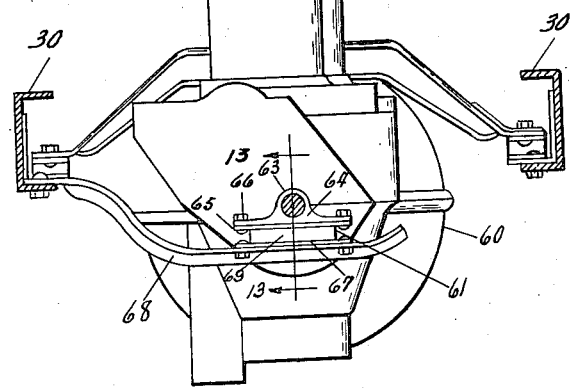
INVENTOR.
JOSEPH M. STEELE
BY
Ely & Barrow
ATTORNEYS.

Patented Jan. 8, 1929.

1,698,006

UNITED STATES PATENT OFFICE.

JOSEPH M. STEELE, OF STOW, OHIO, ASSIGNOR TO JOHN R. GAMMETER, OF AKRON, OHIO.

CUSHIONING CONNECTION FOR VEHICLE CONSTRUCTION.

Application filed February 17, 1927. Serial No. 168,926.

This invention relates to cushioned connections between units of automobiles.

The general purpose of the invention is to improve upon such cushioned connections as have heretofore been employed by avoiding the use of expensive metal housings for the cushioning elements and the formation of interlocking metal parts and molded non-metallic cushioning elements which are expensive to manufacture and which are subject to wear in use due to relative movement between the metal and non-metallic parts.

Particularly the invention contemplates a connection in which the metal and non-metallic parts are bonded together so as to be integral, there being no metallic contact between the units connected thereby and all the relative movement between the units being absorbed by the cushioning material without relative movement between the surfaces thereof and the metal parts to which it is bonded to cause wearing of the cushioning material by surface abrasion thereof.

The foregoing and other objects are obtained by the constructions illustrated in the accompanying drawings and described below. It is to be understood that the invention is not limited to the specific forms thereof shown and described.

Of the accompanying drawings,

Figure 10 is a plan of a motor and a mounting therefor in a chassis in which connections or supports embodying the invention are employed between the motor and chassis;

Figure 11 is a front end elevation thereof, partly in section;

Figure 12 is an enlarged section along line 12—12 of Figure 10; and

Figure 13 is a section along line 13—13 of Figure 12.

Figure 1:
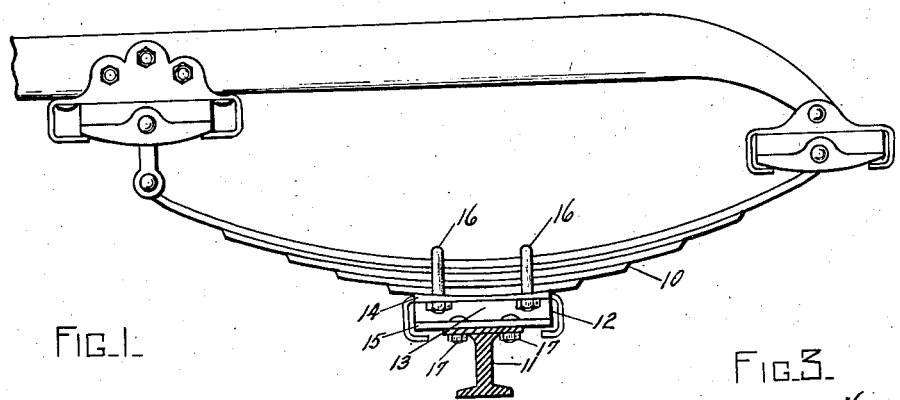
Figure 1 is a side elevation, partly in section, of a spring mounting for a vehicle chassis on a front axle in which connections embodying the invention are shown between the axle and spring and between the spring and the chassis.
Figures 2, 3, 5:
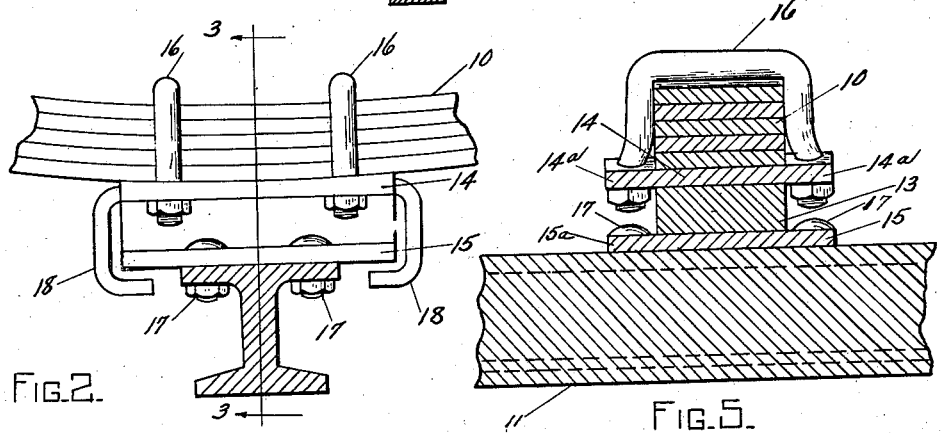
Figure 2 is an enlarged view of a modified form of connection between the axle and spring.
Figure 3 is a section on line 3—3 of Figure 2.
Figure 5 is a section on line 5—5 of Figure 4.

Referring to Figures 1, 2 and 3, a spring 10 is connected to axle 11 by the connection 12 which includes a cushioning element of tough, live or resilient rubber 13 bonded by vulcanization to metal connecting plates 14 and 15 on each side thereof, the plates 14 and 15 each having extending portions 14ᵃ and 15ᵃ providing flanges on the connection 12 by which it may be connected to spring 10 as by U-bolts 16 and to the axle 11 as by bolts 17. The element 13 is sufficiently thick to provide the desired cushioning qualities and the bolts 16 and 17 are preferably offset from each other as shown to insure against contacting with each other during relative yielding movement between the axle and spring. As shown in Figure 2, the upper plate 14 for safety purposes may have elements 18 thereon extending downwardly about and under the ends of plate 15 in embracing relation thereto, but out of contact therewith.

Figure 4:
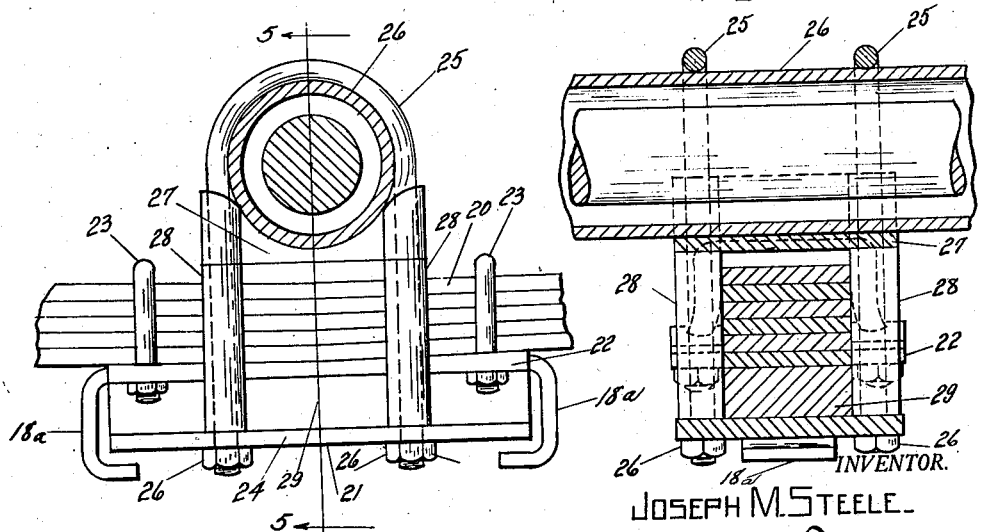
Figure 4 is a side elevation, partly in section, of a connection embodying the invention in an underslung spring mounting.

An underslung spring mounting, such as used on a rear axle is shown in Figures 4 and 5. In this type of mounting spring 20 is connected by U-bolts 23 to upper plate 22 of the cushion connection 21, the lower plate 24 of the connection being connected by U-bolts 25 to axle 26 which is supported in a cradle 27 in turn supported on the lower plate 24 by spacer sleeves 28 on bolts 26. Plates 22 and 24 are bonded by vulcanization to the opposite sides of the rubber cushioning element indicated at 29. Members 18ᵃ similar to members 18 may also be used on this connection.

Figure 6:
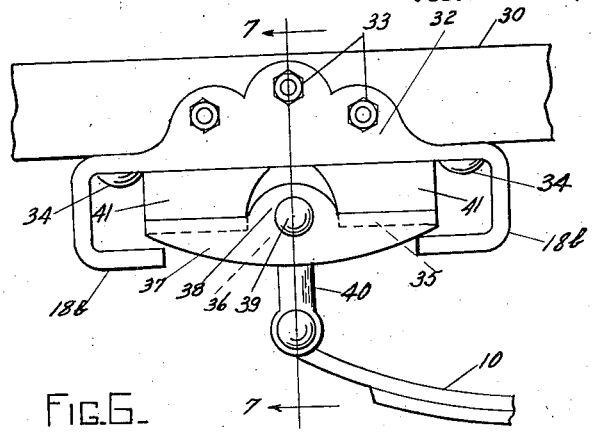
Figure 6 is a detail side elevation of the connection between the rear of the spring mounting and the chassis as shown in Figure 1.
Figure 7:
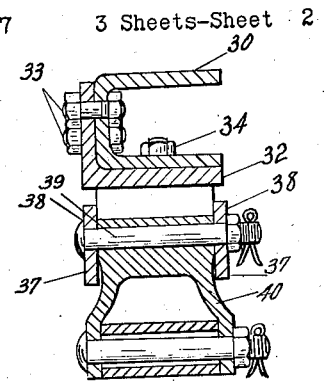
Figure 7 is a section on line 7—7 of Figure 6.

In Figures 6 and 7, the details of a connection 31 between one end of the spring 10 and the chassis 30 are illustrated. The upper plate 32 of the connection is bolted to the chassis 30 at 33 and 34. The lower plate 35 is apertured centrally at 36 and is formed with flanges 37 on its sides shaped as shown to strengthen the plate and provided with apertured lugs 38 for the reception of a shackle bolt 39 arranged in aperture 36 and on which the shackle 40 is pivoted. In this form of the invention the rubber cushion on which plates 34 and 35 are bonded is in two sections 41 vulcanized onto the lower plate 35 on each side of aperture 36. This construction is such as to support the chassis as low as possible. Members 18$^b$ similar to members 18 are illustrated on this connection also.

Figure 8:
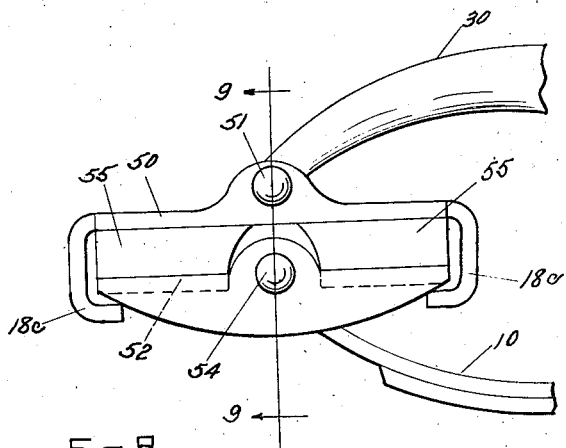
Figure 8 is a detail side elevation of the connection between the front end of the spring mounting and the chassis as shown in Figure 1.
Figure 9:
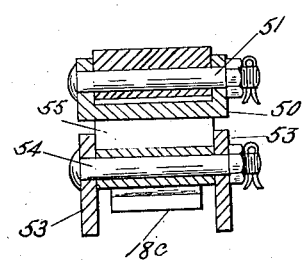
Figure 9 is a section on line 9—9 of Figure 8.

The front spring connection shown in Figures 8 and 9 comprises an upper plate 50 pivoted to the chassis 30 at 51 and a lower plate 52 similar to plate 35 and having flanges thereon similar to flanges 37 in the apertured lugs 53 of which the shackle bolt 54 is inserted on which one end of spring 10 is supported by insertion of bolt 54 through the usual "eye" or loop in the end of the spring. In this form also the cushioning element is in sections 55 vulcanized to both plates 50 and 52 on each side of the aperture through which the bolt 54 extends. Members 18$^c$ similar to members 18 are arranged on the plate 50 so as to embrace plate 52.

Use of the improved connection as a motor support in the vehicle is shown in Figures 9 to 12. The motor housing 60 is supported on the side members 30 of the chassis at three points. At these points the support is afforded by cushioned connections indicated at 61, and 62, 62. The connection 61 at the forward end of the motor consists in a forwardly extending sleeve 63 formed with a web 64 adapted to seat the sleeve 63 on the upper plate 65 of the cushioned connection to which it is secured by bolts 66. The lower plate 67 of the connection is bolted onto a cross beam 68 extending between chassis member 30. The rubber cushion material 69 of the connection is vulcanized to and integral with plates 65 and 67.

At the rear of the motor each of connections 62 are provided by bolting the ends of the cross beam 70 onto the upper plates 71 of connections 62 and by bolting the lower plates 72 of said connections to the channels 30 of the chassis, additional support for the connection preferably being provided for by L-shaped brackets 73 through the horizontal member of which the bolts in plate 72 extend, the vertical members of brackets 73 being bolted to the web of channel members 30. The rubber cushioning material 74 is integral with plates 71 and 72.

It will appear that in all forms of the connections, the rubber cushioning material provides an entirely non-metallic connection between the units which absorb the shocks, preventing crystallization and fracture of the metal parts, preventing the noises incident to relative movement of metal parts, and requiring no lubrication. All relative movement of the part or units connected by these improved connections is absorbed within the body of the cushioning material which is thus constantly being flexed tending to keep the rubber lively and resilient. The integral or bonded connection between the rubber and the metal parts entirely eliminates wear since relative movement of the rubber and metal parts cannot take place.

Modifications of the invention other than those disclosed herein may be resorted to without departing from the spirit thereof or the scope of the appended claims.

What is claimed is:

1. A cushioned connection for vehicle constructions including a metal member adapted to be secured to one unit of the vehicle, a second metal member adapted to be secured to another unit of the vehicle, an element of non-metallic cushioning material arranged between and bonded by vulcanization so as to be integral with said members, and means secured to one member adapted to embrace, but not contact with, the other member.

2. A cushioned connection for vehicle constructions including a metal member adapted to be secured to one unit of the vehicle, a second metal member adapted to be secured to another unit of the vehicle, an element of rubber cushioning material arranged between and vulcanized to said members so as to be bonded thereto, and means secured to one member adapted to embrace, but not contact with, the other member.

3. A cushioned connection for vehicle constructions including a metal member adapted to be secured to one unit of the vehicle, a second metal member adapted to be secured to another unit of the vehicle, and an element of rubber cushioning material arranged between and vulcanized so as to be bonded to said members, and means secured to one member adapted to embrace, but not contact with, the other member.

JOSEPH M. STEELE.